United States Patent [19]

Kentfield

[11] Patent Number: 4,576,064

[45] Date of Patent: Mar. 18, 1986

[54] COUPLING MECHANISM FOR WIND TURBINE

[75] Inventor: John A. C. Kentfield, Calgary, Canada

[73] Assignee: Her Majesty the Queen in Right of the Province of Alberta as represented by the Minister of Energy and Natural Resources, Edmonton, Canada

[21] Appl. No.: 628,880

[22] Filed: Jul. 9, 1984

[30] Foreign Application Priority Data

Aug. 6, 1984 [CA] Canada .................................. 456,151

[51] Int. Cl.[4] ........................ F16H 35/08; F04B 49/00
[52] U.S. Cl. ........................................ 74/833; 417/218
[58] Field of Search .................... 60/398; 74/41, 833, 74/834; 417/15, 35, 212, 218, 334, 335, 336

[56] References Cited

U.S. PATENT DOCUMENTS

| 418,877 | 1/1890 | Salisbury | 74/41 |
|---|---|---|---|
| 617,877 | 1/1899 | Harris | 417/218 |
| 650,761 | 5/1900 | Nichols | 74/41 |
| 841,601 | 1/1907 | Summers et al. | 74/41 |
| 871,024 | 11/1907 | Beates | 74/41 |
| 1,181,671 | 5/1916 | Kemble | 74/41 |
| 1,417,986 | 5/1922 | Giesler | 74/41 |
| 2,555,787 | 6/1951 | D'Amelio | 417/218 |
| 2,688,285 | 9/1954 | Stockett et al. | 417/218 |
| 4,181,043 | 1/1980 | Waddington | 74/750 B |
| 4,392,785 | 7/1983 | Avery | 417/218 |

FOREIGN PATENT DOCUMENTS

| 101963 | 9/1937 | Australia | 417/218 |
|---|---|---|---|
| 897680 | 11/1953 | Fed. Rep. of Germany | 417/336 |
| 2925646 | 11/1980 | Fed. Rep. of Germany | 417/218 |

Primary Examiner—Lawrence J. Staab
Attorney, Agent, or Firm—Millen & White

[57] ABSTRACT

A mechanism is provided for connecting the output shaft of a wind turbine with a load rod, such as the rod of a downhole pump. The mechanism includes a drive train which converts the rotating output of the shaft to a variable amplitude reciprocating output having a frequency varying with the speed of the shaft. A control assembly adjusts the drive train to maintain the amplitude of the reciprocating output proportional with the square of the wind velocity.

4 Claims, 3 Drawing Figures

COUPLING MECHANISM FOR WIND TURBINE

FIELD OF THE INVENTION

This invention relates to a variable-stroke coupling mechanism for interconnecting the rotating output shaft of a wind turbine with a load rod which is to be reciprocated. Such a load rod might be one which actuates a downhole pump, such as a water well pump.

BACKGROUND OF THE INVENTION

With the escalation of fuel and electricity costs in recent times, there has been increased interest in using wind turbines to drive reciprocating downhole pumps.

In the design of such systems, an important component is the coupling mechanism, which connects the rotating output shaft of the tower-mounted wind turbine with the load rod.

This coupling mechanism must, of course, convert the rotating output of the turbine shaft to a reciprocating output which can drive the load rod.

As the output power of the wind turbine varies with variations in the wind velocity, the coupling mechanism should also therefore incorporate a means for varying the pump load to match it with the wind turbine output to maintain a desired system efficiency, normally the maximum achievable efficiency. As the hydraulic head of the pump load remains substantially constant, such means for varying the pump load must therefore work by changing the length of the reciprocating stroke of the load rod.

The present invention is concerned with providing a coupling mechanism which has such capabilities, namely: the capability to convert rotating output to reciprocating output; and the capability to match the pump load with the wind turbine output by varying the stroke length.

In connection with such a coupling mechanism, it is desirable that it be characterized by some or all of the following:

(1) that the mechanism be adapted to automatically vary the stroke length in such a manner as to maintain the wind turbine operating at about its maximum efficiency over a range of wind speeds;

(2) that the mechanism be "self-powered", so there is no need for electric power or a fuel-powered engine; and (3) that the mechanism be reasonably simple, to reduce difficulties in maintaining it.

SUMMARY OF THE INVENTION

In accordance with the invention, there is provided a coupling mechanism which incorporates a first means, connecting the wind turbine output shaft with the load rod, which is operative to convert the variable speed rotational output of the shaft to a variable amplitude reciprocating output having a variable frequency which is substantially proportional to the rotational speed of the shaft. Such first means may comprise:

a crank, to convert the rotational output of the turbine shaft to a reciprocating output;

a generally vertical connecting rod, for transmitting the crank output of the tower-mounted turbine to ground;

a generally horizontal rocking beam positioned at ground level and adapted to rock about a pivot point, the first end of said beam being connected to the rod for oscillation thereby;

and a moveable member, such as a slider block, connected with the second end of the beam and moveable therealong, said slider block being connected with the load rod.

From the foregoing, it will be understood that the amplitude of the stroke of the load rod can be varied by changing the position of the slider block along the second end of the beam. As the slider is moved inwardly to the pivot point, the amplitude decreases; as it is moved outwardly, it increases.

The coupling mechanism further incorporates a second means which functions to adjust the first means to vary the amplitude of the latter's output, in such a way as to maintain it substantially in proportion with the square of the velocity of the wind. This second means requires an input to actuate it. It is a feature of the invention that this input arises from one of the outputs present in the drive system embodied in the combination of the turbine and the first means. Thus the coupling mechanism is self-powering and does not require a motor or electric power to run.

In one form, the second means may comprise:

a drive line and attached lead screw, for translating the slider block back and forth on the beam as required;

a dog clutch fork slidable between three operating positions, namely: a first position, in which it engages a first dog which, through a drive shaft and a first gear assembly, rotates the drive line clockwise; a second position, in which it engages a second dog which, through the drive shaft and a second gear assembly, rotates the drive line counterclockwise; and a third neutral position, in which it does not engage either dog so that the drive line is at rest;

a power take-off for transmitting reciprocating output from the first means to the drive shaft;

a double-acting hydraulic pump, actuated by the power take-off, for feeding oil from a reservoir to a clutch fork-actuating cylinder connected in parallel with a restrictive orifice, at a velocity proportional to the speed of the turbine shaft;

such orifice controlling the discharge of the oil from the pressurized portion of the hydraulic circuit, so that the pressure in the cylinder varies proportionally to the square of the speed of the turbine shaft, whereby the cylinder applies a corresponding force, or actuating thrust, to the clutch fork;

and a spring, arranged to exert an opposing force on the clutch fork, said spring being arranged to be tensioned in concert with the rotation of the drive line, so that the magnitude of the spring tension is directly proportional to the distance of the slider block from the pivot point of the beam, where the stroke is zero;

whereby the dominant of the two forces will cause the clutch fork to assume one of the driving positions to cause movement of the slider block in a particular direction until equilibrium of the forces, arising from steady state wind conditions, causes the fork to return to the neutral position, whereby the amplitude of the reciprocating stroke of the load rod is maintained substantially in proportion with the square of the velocity of the wind at a frequency substantially proportional to the rotational speed of the shaft.

By managing to vary the length of the reciprocating stroke to maintain it proportional to the square of the wind velocity (or, alternatively, the square of the wind turbine shaft speed), the mechanism functions to match the pump load with the turbine output, thereby maintaining turbine efficiency substantially at a maximum.

The invention will now be described in the context of the specific embodiment shown in the drawings. The scope of the invention is defined in the appended claims.

DESCRIPTION OF THE PREFERRED EMBODIMENT

Figure 1:
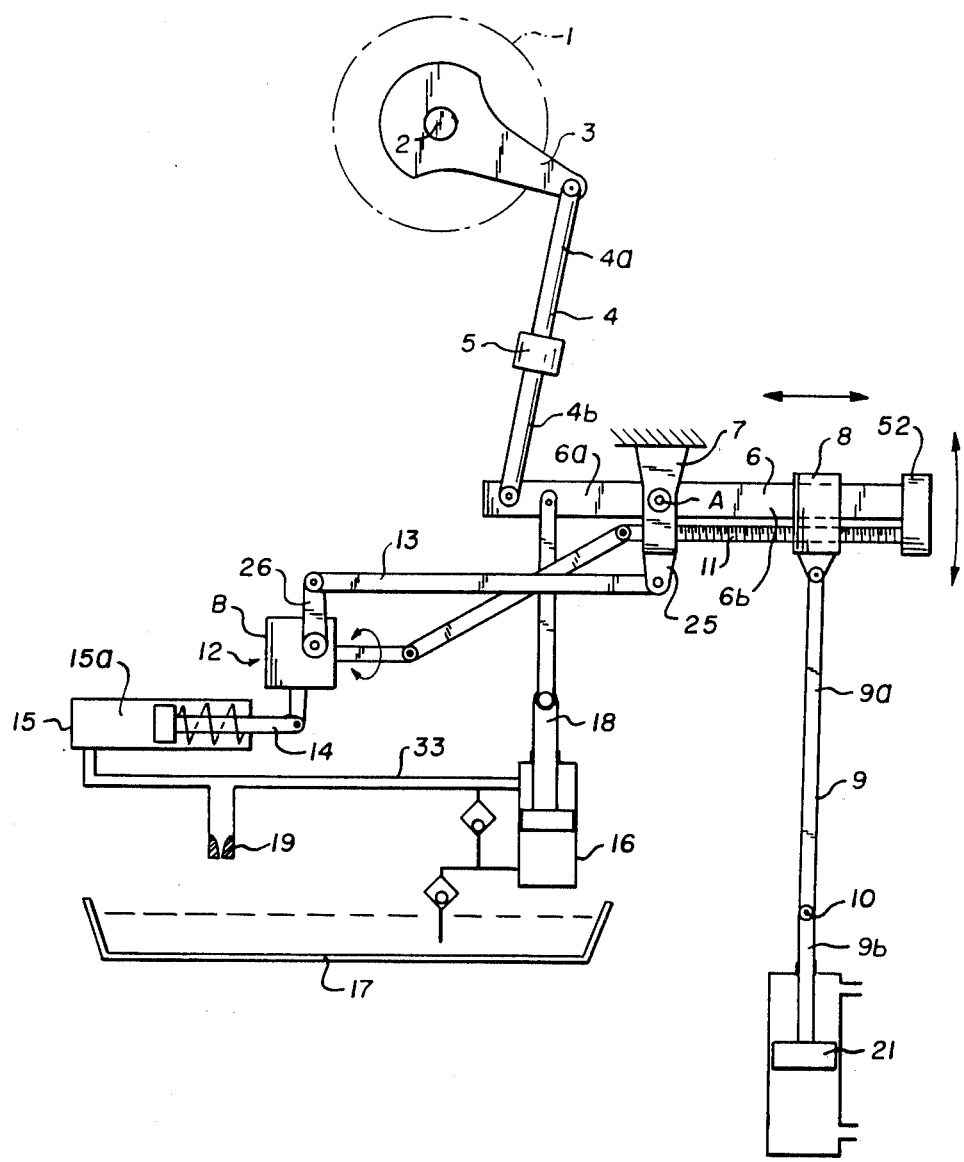
FIG. 1 is a schematic showing the scheme of the coupling mechanism as it extends between the output shaft of a wind turbine and the load rod of a downhole pump.

Having reference to FIG. 1, there is provided a wind turbine 1 having a rotating output shaft 2. The wind turbine 1 will usually be elevated on a support (not shown), such as a tower or the like. It will be pivotally mounted in conventional fashion on the support, so that it may rotate or yaw with the wind direction.

A crank 3 is affixed to the turbine shaft 2 and functions to reciprocate a generally vertical connecting rod 4, to which it is pivotally attached.

The connecting rod 4 has upper and lower ends 4a, 4b, interconnected by a swivel joint 5. The latter permits the turbine 1 and crank 3 to yaw with the wind direction. The lower end of the connecting rod 4 is pivotally connected to the input arm 6a of a generally horizontal, ground-located rocking beam 6.

The beam 6 is pivotally mounted on a support 7, so as to rock about the pivot point A.

A slider block 8 is slidably mounted on the output arm 6b of the rocking beam 6, for movement along said output arm. The slider block 8 is pivotally connected with the upper end of the load rod 9. Said load rod comprises uper and lower ends 9a, 9b, interconnected by a pivot pin 10.

Thus, the crank 3 functions to convert the rotating output of the turbine shaft 3 to a fixed amplitude-potentially variable frequency reciprocating output. The connecting rod 4 transmits said output to ground level and rocks the beam 6 about the pivot point A. The output arm 6b of the beam 6 functions to reciprocate the load rod 9. The utilization of the rocking beam 6 and the variable positioning of the slider block 8 along said beam are operative to convert the fixed amplitude-potentially variable frequency output of the connecting rod 4 to a potentially variable amplitude reciprocating output having a frequency proportional to the variable frequency of the rod 4 and the speed of the turbine shaft 2. Shifting of the position of the slider block 8 along the output arm 6b modulates the length of the stroke of the load rod 9.

The slider block 8 can be moved along the rocking beam 6 by a lead screw 11 connected with said beam. The lead screw 11 is threaded, as is the internal bore of the slider block 8, through which the lead screw extends. Thus, rotation of the lead screw 11 causes movement of the slider block 8 along the rocking beam 6. The position of the slider block 8 is dictated by the extent and direction of rotation of the lead screw 11.

A control and drive assembly 12 is provided to actuate the lead screw 11. This assembly 12 incorporates two drive train assemblies which it selects between to rotate the lead screw 11. One such drive train assembly rotates the lead screw 11 in a clockwise direction, to translate the slider block 8 outwardly to increase the length of the load stroke. The other drive train assembly rotates the lead screw 11 counterclockwise, to translate the slider block 8 inwardly to shorten the stroke.

A linkage 13 connects the rocking beam 6 to the control and drive assembly 12 and supplies a fixed amplitude-variable frequency reciprocating input to actuate the latter.

The control and drive assembly 12 incorporates an actuator cylinder 15 having a piston 14. This piston 14 is acted on by pressurized, substantially incompressible fluid, such as a light lubricating oil. This fluid is pumped into the actuator cylinder 15 by a double-acting pump-cylinder 16, which draws it from a fluid reservoir 17. The piston 18 of the pump-cylinder 16 is connected to the input arm 6b of the rocking beam 6. Thus the piston 18 is reciprocated at a frequency corresponding with the speed of the turbine shaft 2, which is proportional to the wind velocity. Thus the fluid is pumped into the pressurized portion of the hydraulic system at a rate which is proportional to the varying wind velocity.

A restrictive orifice 19 is provided in the fluid supply line 33 leading to the actuator cylinder 15. This orifice 19 is operative to establish the fluid pressure within the actuator cylinder 15.

Since the pressure drop across an orifice is, in accordance with Bernoulli's equation, substantially proportional to the square of the flow velocity through the orifice; and since the orifice 19 is supplied with an essentially incompressible fluid; it follows that, since the pump-cylinder piston 18 is reciprocated with an invariant amplitude at a frequency corresponding with the rotational speed of the turbine shaft 2, the pressure drop across the orifice 19 is substantially proportional to the square of said turbine shaft speed.

In addition, since the rotational speed of the turbine shaft 2 is a function of the wind speed, it follows that, provided the load adjustment schedule permits the wind turbine to operate at one point, preferably that corresponding to maximum turbine efficiency on the operating cheacteristic, the pressure drop across the orifice 19 is proportional to the square of the wind speed.

It is commonly known that the torque of a wind turbine is, for an invariant wind turbine efficiency and velocity ratio, proportional to the square of the wind velocity. Thus, with a reciprocating fluid load pump 21 of fixed bore raising fluid through an invariant lift, the stroke of the load pump (and hence that of the load rod 9) should vary substantially as the square of the wind speed.

The control and drive assembly 12 is designed to incorporate a capability for varying the load rod stroke substantially as the square of the wind speed. More particularly, the actuator cylinder piston 14 is connected to the fork 35 of a dog clutch assembly 34. The pressure generated force acting on said actuator cylinder piston 14 urges the fork 35 to cause the clutch assembly 34 to activate the drive train assembly which moves the slider block 8 outwardly. The pressure-influenced biasing of the actuator cylinder piston 14 is opposed by a tension spring 24, which is also attached to the fork 35. This spring 24 seeks to cause the clutch assembly 34 to activate the drive train assembly which moves the slider block 8 inwardly.

The tension in the spring 24 is increased, by suitable means, in direct proportion to the displacement of the slider block 8 from the minimum stroke position (i.e. the pivot point A). The dominant of the opposing pressure and spring forces governs which drive train assembly is actually engaged. The result of the competing actions of the actuator cylinder 15 (the varying pressure within which is proportional to the square of the wind speed) and the spring (whose tension varies linearly in direct proportion to the slider block displacement), yields the correct slider block position needed to maintain the load rod stroke substantially proportional to the square of the wind velocity, thereby ensuring maximum efficiency of the turbine operation.

The control and drive assembly 12 will now be described in greater detail.

This assembly 12 is housed in a box-like housing or frame B and the assembly parts are supported by the walls of that box and a plurality of partitions (not shown) extending across its interior. Besides providing support means for the various shafts and parts, the housing B provides an oil reservoir 17, for supplying the hydraulic circuitry of the assembly.

The assembly 12 is actuated by an input derived from the rocking beam 6. More particularly, the linkage 13 is pivotally connected at one end to a lug 25 projecting from the rocking beam 6. At its other end, the linkage 13 is pivotally connected to the lever 6. As the rocking beam 6 oscillates, a push-pull motion is imparted to the linkage 13 and, in turn, to the lever 26. This input to the assembly 12 is of fixed amplitude and a varying frequency proportional to the turbine shaft speed.

The lever 26 is locked to the rotatably mounted shaft 27. Thus the push-pull motion imparted to the lever 26 acts to rotate the shaft 27, first in one direction and then in the other.

An input rocking arm 28 is locked to the shaft 27. Back and forth rotation of the shaft 27 is operative to rock the arm 28 about its connection point with the shaft 27.

The input rocking arm 28 is connected to the piston 18 of the pump-cylinder 16. Thus the piston 18 is reciprocated by a train connecting with the rocking beam 6 and consisting of the arm 18, shaft 27, lever 26, and linkage 13. As a result, the pump-cylinder piston 18 is reciprocated at a varying frequency, corresponding with that of the rocking beam 6, which is proportional to the turbine shaft speed and wind velocity.

The arm 28 is also pivotally connected through a rod 29 with one end of a sprag clutch driving arm 30. This driving arm 30 is connected at its other end through a sprag clutch component 31a with a rotatably mounted clutch shaft 32. A second sprag clutch component 31b is also mounted on the clutch shaft 32. This second component 31b is adapted to lock the clutch shaft 32 against rotation during the down stroke only of the driving arm 30.

Thus, rocking of the input arm 28 oscillates the driving arm 30 abouts its gripping connection with the clutch shaft 32. The sprag clutch components 31a, 31b operate to impart only counterclockwise rotation in one direction only to the clutch shaft 32.

A clutch assembly 34 is mounted on the clutch shaft 32. This clutch assembly 34 includes a fork 35 and left and right driving dogs 36, 37, which are splined to the shaft 32. The fork 35 is pivotally mounted on a cross shaft 35a so that its lower end can be rotated slightly whereby that it moves to the left and right along the shaft 32. The driving dogs 36, 37 are secured to the fork 35 and therefore move with it along the shaft 32.

Left and right free-floating wheel gears 38, 39 are also mounted on the shaft 32. The wheel gears 38, 39 have respective integral driven dogs 38a, 39a.

The fork 35 and driving dogs 36, 37, constituting the central element of the clutch, can be shifted between three positions. In the first position, the left driving dog 36 engages the driven dog 38a, whereby the shaft 32 becomes operative to rotate the left wheel gear 38 in a counterclockwise direction. In the second or neutral position, neither of the driving dogs 36, 37 engage the driven dogs 38a, 39a. And in the third position, the right driving dog 37 engages the driven dog 39a, whereby the shaft 32 becomes operative to rotate the right wheel gear 39 in a counterclockwise direction.

A rotatably mounted lead screw drive shaft 40 is positioned parallel and adjacent to the clutch shaft 32. This shaft 40 is connected, through universal joints 32a and extensions 32b, with the lead screw 11.

A left wheel gear 43 is keyed onto the shaft 40. The wheel gear 43 is arranged to be driven in a clockwise direction by the left wheel gear 38 of the clutch shaft 32. A right wheel gear 41 is also keyed onto the shaft 40 and is arranged to be driven in a counterclockwise direction by the right wheel gear 39 acting through an idler wheel gear 42. The directions of rotation are indicated by the arrows.

From the foregoing, it will be understood that, when the fork 34 is shifted to the left to the first position, the lead screw drive shaft 40 is rotated in a clockwise direction and the slider block 8 is moved outwardly. When the fork 3 is shifted to the right, to the third position, the shaft 40 is rotated counterclockwise and the slider block 8 is moved inwardly. When the fork 34 is in the neutral position, the shaft 40 is stationary, as is the slider block 8.

As previously stated, the position of the clutch assembly 34 is determined by the dominant of two forces which act against the clutch fork 35 in opposite directions. When the forces are equal, which occurs when the wind substantially steadies and the assembly 12 reaches an equilibrium, the clutch assembly 34 remains in the neutral position.

The first force referred to arises from the actuator cylinder 15, whose piston 14 is pivotally connected to the clutch fork 35. The force applied by the piston 14 is a function of the fluid pressure within the cylinder 15.

The fluid is pumped into the actuator cylinder 15 by the pump-cylinder 16, through the line 33. The reciprocating piston 18 of the pump-cylinder 16 is of the differential type, so that oil is delivered on both strokes.

The line 33 includes a branch 33a, which terminates in an outlet 44 through which oil is sprayed onto the working parts of the assembly 12, from whence it returns to the reservoir 17.

The restrictive orifice 19 is mounted in the branch 33a, to control the pressure in the line, and thus in the actuator cylinder 15.

In operation, the orifice 19 functions to maintain a pressure within the actuator cylinder chamber 15a, which pressure varies proportionately with the square of the wind speed.

The second force referred to arises from the spring 24, which is attached at one end to the clutch fork 35 and which acts in opposition to the actuator cylinder 15. More particularly, the opposite end of the spring 24 is attached to a cable 24a. The cable 24a extends around the pulley 48 and is attached at its other end to drum 47.

The drum 47 is mounted on and secured to a rotatable shaft 49. This shaft 49 has attached to it a worm wheel 50.

The lead screw drive shaft 40 has a worm gear 51 secured thereto, which meshes with the worm wheel 50.

Therefore, as the lead screw drive shaft 40 rotates to move the slider block 8, the worm 51 rotates the worm wheel 50 and the shaft 49 and drum 47. This increases or decreases the tension in the spring 24, depending on the direction of rotation of the shaft 40.

It will be appreciated, therefore, that the force exerted by the spring 24 on the clutch fork 35 is directly proportional to the distance of the slider block 8 from the pivot point A.

A safety system is incorporated in the control and drive assembly 12, to prevent the slider block 8 from reaching the block 52 and lug 25 at the ends of the rocking beam output arm 6b. More particularly, a cable 53, attached at one end to the drum 47, extends around the pulley 54 and through the stationary blocks 55, 56. The blocks 55, 56 are mounted on a link 57, which is pivotally connected with the fork 35. A collar 58 is affixed to the cable 53, between the blocks 55, 56. The distance between the blocks 55, 56 is selected to be proportional to the length of travel to which the slider block 8 is to be limited. The other end of cable 53 passes around pulley 46, which is coaxial with pulley 48, and is also secured to drum 47 in such a manner that cable 53 is neither lengthened or shortened by rotation of drum 47.

In operation, when the collar 58 contacts one of the blocks 55, 56, the link 57 will shift the fork 35 to the neutral position.

In another feature of the mechanism, there is provided an "unloading" assembly 59 for enabling the fork 35 and driving dogs 36, 37 (collectively referred to hereafter as the "fork assembly") to quickly and smoothly disengage from each of the driven dogs 38a, 39a.

In an early prototype of the mechanism, it was found that a relatively high pressure in the actuator cylinder 15 was required to move the fork assembly, and thus there was delay in disengagement. This delay changed adversely the characteristics of the control system—i.e. the slider block 8 was not in the right position according to the desired squared function. This problem was due to the characteristics of the one way sprag clutches used. The outer race of the sprag clutch drives the inner race in one direction, while not allowing backlash. This "perfect" operation of the one way clutches caused the sliding fork assembly, which is keyed to the shaft 32, to apply a continuous load on the engaged driven dog, even during the down stroke motion (FIG. 2) of the sprag clutch arm 30, when the shaft 32 is not driven, thereby tending to inhibit clutch movement.

Figure 2:
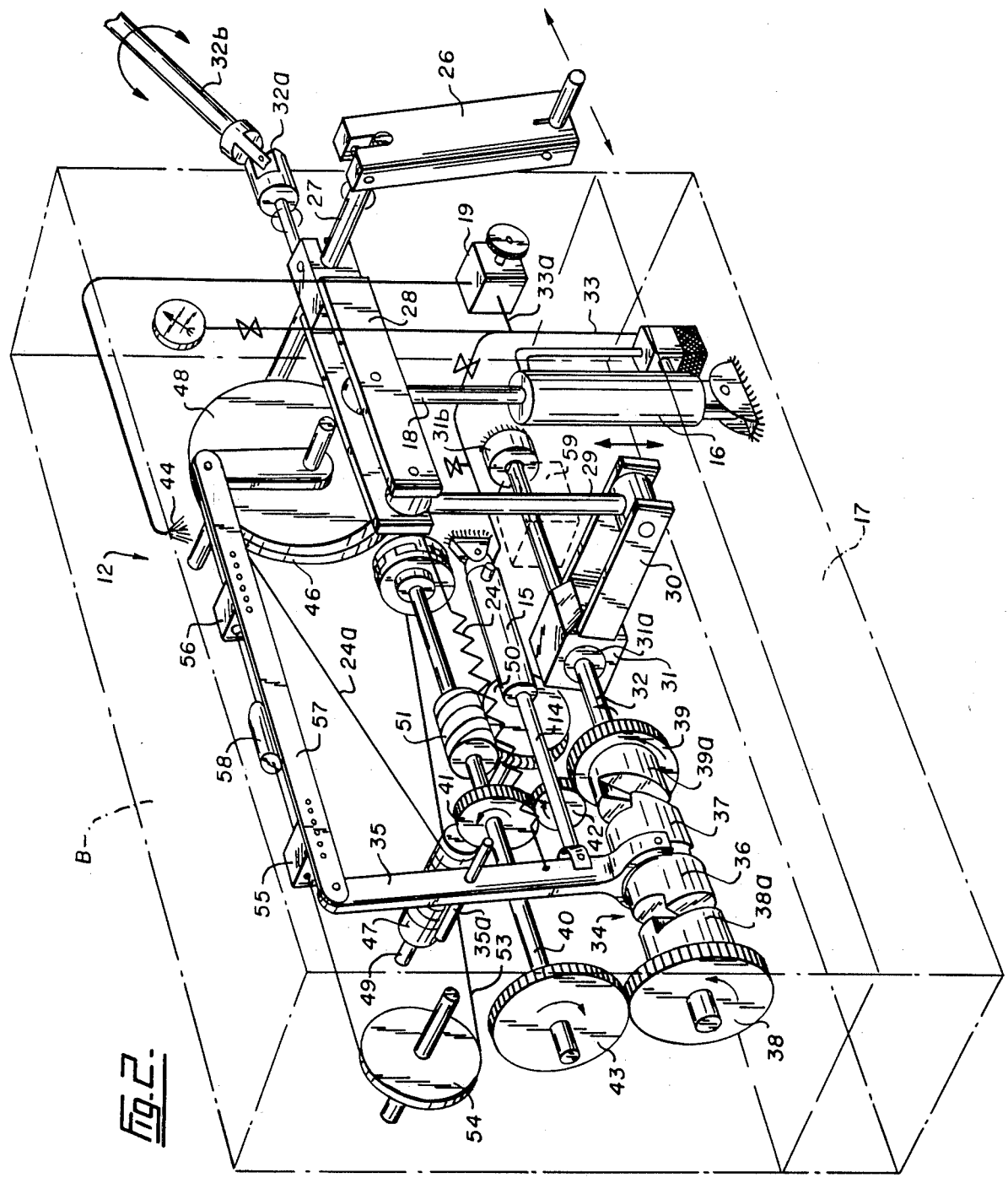
FIG. 2 is a perspective view of the control and drive assembly which forms the second means referred to in the summary—this figure is schematic in some respects, as the assembly is contained in a box-like housing, which is shown in shadow lines, and the parts of the assembly are suspended from or attached to the walls of the housing or partitions (not shown) extending between said walls.
Figure 3:
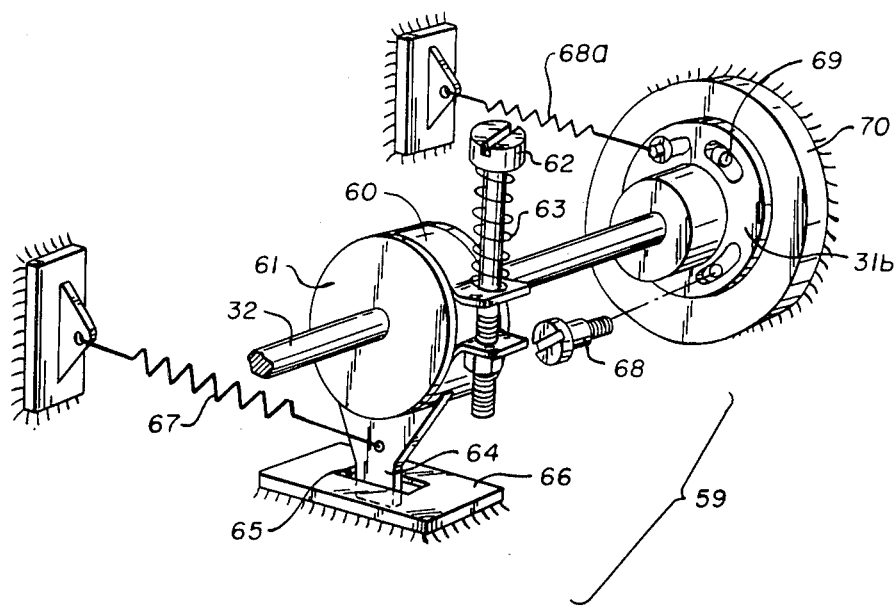
FIG. 3 is a side view, consistent with FIG. 2, showing the unloading assembly, omitted from the other two drawings, which forms part of the control and drive assembly.

The unloading assembly 59 is shown in FIG. 3. The purpose of the unloading assembly is to rotate the input shaft backwards (i.e. in the opposite direction to that occurring during driving) through a small angle, say 3°, to relieve the load between the driving and driven cluch dogs. The unloading assembly is mounted on the right end of the shaft 32, as indicated in FIG. 2. A thin strip 60 of mild steel is wrapped around a brass drum 61 secured to the clutch shaft 32. The strip 60, which constitutes a band brake, is tightened onto the drum 61 by the screw 62 and compression spring 63, to adjust its tension. A peg 64 is rigidly attached to the strip 60 and projects into a slot 65 machined in a bracket 66 attached to the housing B. The peg 64, constrained by slot 65, permits only limited angular movement of drum 6. A weak tension spring 67 connects the peg 64 to the housing B and functions to pull on the peg.

To permit the unloading assembly to operate in the intended manner, provision is also made to permit the outer housing of sprag clutch 31b to oscillate slightly in the fixed housing 70 by use of retaining screws 68 in slotted retaining holes 69. A very weak spring, 68a, isconnected to the outer portion of the sprag clutch 31b, to ensure that said outer portion returns to its original angular position during the initial portion of the driving portion of the cycle i.e. when arm 30 is being raised.

When the sprag clutch arm 30 is raised, the clutch shaft 32 is driven by the one way clutch and the drum 61 slips on the metal strip 60. When the arm 30 is pushed down, the drum 61 does not slip and rotates slightly clockwise, due to the force exerted by the spring 67 on the peg 64. Hence, the clutch shaft 32 is rotated slightly in a direction opposite to the driving direction, permitting the driving dog to separate easily from the driven dogs 38a or 39a. This unloading action occurs during the downstroke of the arm 30, when the clutch shaft 32 is not driven.

Advantages

The coupling mechanism has the following advantages:

(1) The mechanism adjusts, automatically, the pump load, by stroke modulation, of a water-pumping wind-turbine to ensure that the wind-turbine always operates at substantially peak efficiency over a wind-speed range. This range may vary from essentially zero wind-speed to that at which feathering, or furling, occurs;

(2) The system is of the servo type. As such, the accuracy, or precision, with which the pump stroke is varied is substantially independent of the loads, or forces, due to the water pumping action;

(3) Due to the servo nature of the system, the power available to vary the stroke is extracted directly from the wind-turbine and hence relatively large powers are available to affect stroke changes;

(4) No auxiliary power input is required. Hence the system is of the "stand alone" class and is independent of electrical power supply or fuel supply;

(5) Being non-electrical, the system should be less vulnerable to damage, or mal-functioning, during electrical storms than an electrical, or electronic, control system;

(6) Control system failure will not, inherently, cause catastrophic failure of the wind-turbine. For example, a loss of control system hydraulic pressure merely results in the stroke becoming a minimum with the turbine achieving a runaway condition, until the wind-speed becomes sufficient to initiate feathering, or furling. A broken control system main spring 24 results only in an undesired stroke increase with consequent stalling of the wind-turbine.

The embodiments of the invention in which an exclusive property or privilege is claimed are defined as follows:

1. A coupling mechanism for connecting the rotating output shaft of a wind turbine, mounted on a tower, with a load rod to be reciprocated, comprising:
    (a) means, connected with the shaft, for converting the variable speed rotational output of the shaft to a fixed amplitude reciprocating output, which has a variable frequency substantially proportional to the rotational speed of the shaft, and transmitting said output;
    (b) a ground-supported pivot member and a first member pivotally mounted on said pivot member for pivoting in a vertical plane, said first member being connected to the means (a) for oscillation thereby;
    (c) a connector pivotally connected with the first member and being movable therealong, said connector further being connected with the load rod, whereby the load rod may be reciprocated at an amplitude varying with the position of the connection point of the connector with the first member and at a variable frequency substantially proportional to the rotational speed of the shaft;
    (d) said means (a), (b), and (c) together forming means for driving the load rod; and
    (e) a control and actuating assembly for varying the stroke length of the output of the driving means by adjusting the position of the aforesaid connection point, said assembly comprising:
        (i) means, connected with the driving means, for transmitting a reciprocating power input from said driving means to the control and actuating assembly;
        (ii) means, connected with and operating by the means (i), for generating a first force whose magnitude varies substantially proportionally with the square of the wind velocity;
        (iii) means for generating a second force whose magnitude is directly proportional to the position of the connection point of the connector with the first member;
        (iv) a clutch assembly movable between first and second engaging positions and a neutral position;
        (v) first and second drive assemblies connected with the connector and the clutch assembly, whereby the first drive assembly is operative to move the aforesaid connection point outwardly from the pivot member when the clutch assembly engages it in the first engaging position, and the second drive assembly is operative to move the aforesaid connection point inwardly toward the pivot member when the clutch assembly engages it in the second engaging position;
        (vi) said means (ii) and (iii) being arranged to direct their forces in opposite directions on the clutch assembly so that a dominant force will cause the clutch assembly to engage one of the drive assemblies to move the connector in a particular direction until equilibrium of the forces causes the clutch assembly to assume the neutral position, whereby the amplitude of the reciprocating stroke of the load rod is maintained substantially in proportion with the square of the velocity of the wind at a frequency substantially proportional to the rotational speed of the shaft.

2. The coupling mechanism as set forth in claim 1 wherein:
    the means (ii) comprises
    a positive displacement hydraulic pump means, driven by the means (i), for pumping a substantially incompressible fluid at a velocity proportional to the wind velocity through an output line,
    an actuating cylinder, connected with the output line of the pump means, adapted to supply the first force to the clutch assembly,
    and a restrictive orifice for controlling the discharge of excess fluid from the output line and actuating cylinder, whereby said orifice maintains a pressure within the actuating cylinder which varies substantially proportionally with the square of the wind velocity.

3. The coupling mechanism as set forth in claim 2 wherein:
    the means (iii) comprises
    a spring connected at one end to the clutch assembly to supply the second force,
    and means for tensioning the spring in direct relation to the displacement of the aforesaid connection point.

4. The coupling mechanism as set forth in claim 3 wherein:
    the control and actuating assembly is housed in an enclosure, whereby oil may be sprayed over the parts to lubricate and preserve them.

* * * * *